United States Patent
Livingston et al.

(10) Patent No.: US 10,826,572 B2
(45) Date of Patent: Nov. 3, 2020

(54) PRESERVING DIGITAL INK SPATIAL RELATIONSHIPS IN ELECTRONIC MESSAGES

(71) Applicant: Microsoft Technology Licensing, LLC, Redmond, WA (US)

(72) Inventors: Elise L. Livingston, Seattle, WA (US); Allison Smedley, Issaquah, WA (US); Robin Winter Troy, Kirkland, WA (US); Daniel Y. Parish, Seattle, WA (US); Zhouying Fan, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/954,245

(22) Filed: Apr. 16, 2018

(65) Prior Publication Data
US 2019/0319903 A1   Oct. 17, 2019

(51) Int. Cl.
*H04B 7/0417* (2017.01)
*H04W 4/14* (2009.01)
*H04B 7/0413* (2017.01)

(52) U.S. Cl.
CPC ......... *H04B 7/0417* (2013.01); *H04B 7/0413* (2013.01); *H04W 4/14* (2013.01)

(58) Field of Classification Search
CPC ..... G06K 9/00402; H04L 51/10; H04W 4/14; H04M 1/72522; H04B 7/0413; H04B 7/0447; H04B 7/0417; H04B 7/0619
See application file for complete search history.

(56) References Cited

U.S. PATENT DOCUMENTS

| | | | |
|---|---|---|---|
| 2002/0081027 A1* | 6/2002 | Chatterjee | G06F 17/242 382/173 |
| 2004/0228532 A1 | 11/2004 | Fernandez et al. | |
| 2013/0339459 A1 | 12/2013 | Kumashio | |
| 2014/0210798 A1* | 7/2014 | Wilson | G06F 3/0414 345/179 |
| 2014/0337804 A1* | 11/2014 | Hwang | G06K 9/00422 715/863 |
| 2015/0121203 A1 | 4/2015 | Saund et al. | |
| 2015/0264542 A1* | 9/2015 | Kim | G06T 13/00 455/414.4 |
| 2016/0232146 A1* | 8/2016 | Su | G06F 17/242 |
| 2017/0206406 A1* | 7/2017 | Onis | G06K 9/00422 |

* cited by examiner

*Primary Examiner* — Fred A Casca
(74) *Attorney, Agent, or Firm* — Michael Best & Friedrich LLP (57) ABSTRACT

Systems and methods for sending an electronic message including digital ink. One system includes at least one electronic processor. The at least one electronic processor is configured to receive the digital ink for inclusion in the electronic message, determine positional information for the digital ink, the positional information representing a position of the digital ink within the electronic message relative to a position of at least one additional object within the electronic message, and send the digital ink and the positional information as part of the electronic message.

18 Claims, 4 Drawing Sheets

PRESERVING DIGITAL INK SPATIAL RELATIONSHIPS IN ELECTRONIC MESSAGES

FIELD

Embodiments described herein generally relate to methods and systems for receiving digital ink within the body of an electronic message and sending the electronic message to a recipient while preserving spatial relationships between the digital ink and other data included in the message (text, images, and the like).

SUMMARY

Some electronic messaging services allow a user to add digital ink to the body of an electronic message, such as an e-mail message, a text message, an instant message, or the like. Rather than being converted to text, the digital ink may be retained as a graphical object included in the body of the electronic message. The digital ink may be semantically related to other content included in the body of the message. For example, a user may draw an arrow toward an image or a portion of an image included in the body of the message to annotate the image.

When the electronic message is sent to a recipient, the digital ink may be displayed differently (for example, at a different position) within the body of the message based on the service or device used by the recipient, which may impact the digital ink's intended spatial relationship. For example, continuing with the arrow example provided above, when the electronic message is displayed to the recipient the arrow may be displayed differently within the body of the electronic message such that the arrow points to different content in the body than the sender intended.

Embodiments described herein provide methods and systems for sending digital ink to a recipient with metadata that describes how the digital ink is semantically related to other content included in a body of an electronic message. Accordingly, when the body of the electronic message is displayed to the recipient, the digital ink is properly displayed within the body of the electronic message to preserve the sender's intended spatial relationship. Sending the metadata also allows the recipient to select or change the digital ink and retains the original resolution of the digital ink and the associated content.

Alternatively or in addition, embodiments described herein may convert digital ink and objects surrounding the digital ink (text, images, and the like) into a single image (effectively creating a screenshot of the digital ink and the semantically-related content) to preserve semantic relationships between the digital ink and other content in the body of the message. For example, in some embodiments, a screenshot may be created of the digital ink that can be used as a backup if a device used by a recipient is not configured to separately process digital ink within the body of an electronic message.

For example, one embodiment provides a system for sending an electronic message including digital ink. The system includes at least one electronic processor. The at least one electronic processor is configured to receive the digital ink for inclusion in the electronic message, determine positional information for the digital ink, the positional information representing a position of the digital ink within the electronic message relative to a position of at least one additional object within the electronic message, and send the digital ink and the positional information as part of the electronic message.

Another embodiment provides a method of displaying an electronic message. The method includes receiving, with an electronic processor, the electronic message, the electronic message including digital ink and positional information, the positional information representing a position of the digital ink within the electronic message relative to a position of at least one additional object within the electronic message and displaying the digital ink within a body of the electronic message based on the positional information.

Yet another embodiment provides non-transitory computer-readable medium storing instructions that, when executed by an electronic processor, perform a set of functions. The set of functions includes receiving an electronic message from a first user device, the electronic message including an image, digital ink, and positional information associated with the digital ink, the positional information representing a position of the digital ink within the electronic message relative to a position of at least one additional object within the electronic message and receiving from a second user device a request for the electronic message. The set of functions also includes, in response to the request, determining whether the second user device is configured to display digital ink within electronic messages, in response to the second user device being configured to display digital ink within electronic messages, transmit the electronic message including the digital ink and the positional information associated with the digital ink to the second user device, and, in response to the second user device not being configured to display digital ink within electronic messages, transmit the electronic message including the image to the second user device.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, spatial relationships of digital ink with respect to other content included in an electronic message may be unintentionally modified when the electronic message is displayed to a recipient. As described in more detail below, embodiments provided herein preserve such spatial relationships of digital ink by sending the digital ink to a recipient with metadata describing the spatial relationship, which allows the digital ink to be properly displayed to the recipient within the body of an electronic message.

Figure 1:
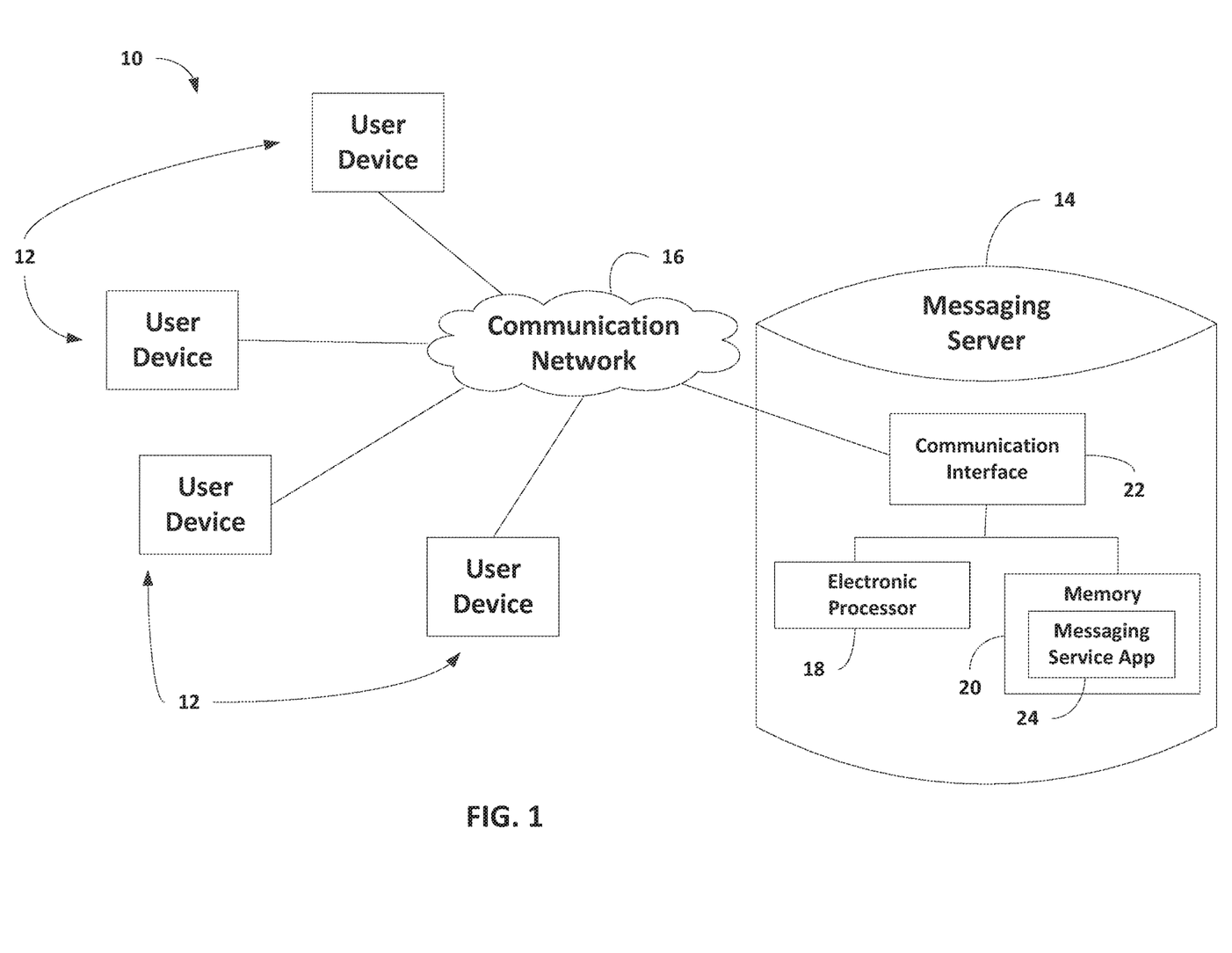
FIG. 1 schematically illustrates a system for sending and receiving electronic messages according to one embodiment.

For example, FIG. 1 schematically illustrates a system 10 for sending and receiving electronic messages. The system 10 includes a plurality of user devices (individually referred to herein as a "user device 12" or collectively referred to herein as "user devices 12") and a messaging server 14. The user devices 12 communicate with the messaging server 14 via a communication network 16. It should be understood that the system 10 may include additional components than those illustrated in FIG. 1 in various configurations. For example, although only four user devices 12 are illustrated in FIG. 1 as one example, many more users may interact (via user devices) with the messaging server 14. Furthermore, the messaging server 14 may include any number of servers organized in various configurations including a set of servers provide cloud-based services. Also, a user device 12 may communicate with the messaging server 14 over additional communication networks 16 or a network different from the communication network 16 used by a different user device 12. In addition, in some embodiments, a user device 12 communicates with the messaging server 14 over the communication network 16 via one or more intermediary devices, including, for example, firewalls, gateways, routers, and the like.

The communication network 16 illustrated in FIG. 1 can include wired networks, wireless networks, or a combination thereof that enable communications between the various entities in the system 10. In some configurations, the communication network 16 includes cable networks, the Internet, local area networks (LANs), wide area networks (WAN), mobile telephone networks (MTNs), and other types of networks, possibly used in conjunction with one another, to facilitate communication between the user devices 12 and the messaging server 14.

The message server provides electronic messaging services. Accordingly, a user may use a user device 12 to send and receive (access and view) electronic messages. As used in the present application, electronic messages includes e-mail messages, text messages, instant messages, or other messages communicated electronically. As illustrated in FIG. 1, messaging server 14 can include an electronic processor 18, a computer-readable memory 20, and a communication interface 22. The electronic processor 18, memory 20, and communication interface 22 communicate wirelessly, over one or more wired communication channels or busses, or a combination thereof. The memory 20 can include non-transitory memory, such as random access memory, read-only memory, or a combination thereof. The electronic processor 18 can include a microprocessor configured to execute instructions stored in the memory 20. The memory 20 can also store data used with and generated by execution of the instructions. The communication interface 22 allows the messaging server 14 to communicate with external networks and devices, including the communication network 16. For example, the communication interface 22 may include a wireless transceiver for communicating with the communication network 16. It should be understood that the messaging server 14 included in the system 10 may include additional components than those listed in FIG. 1 in various configurations. For example, in some embodiments, the messaging server 14 includes a plurality of electronic processors, a plurality of memories, a plurality of communication interfaces, or a combination thereof.

As also illustrated in FIG. 1, the memory 20 stores a messaging service application 24. The messaging service application 24 (as executed by the electronic processor 18) provides messaging services to a user communicating with the messaging server 14 via a user device 12. As noted above, the messaging service may allow a user to send and receive electronic messages. In some embodiments, the messaging service application 24 (or other applications stored and executed by the messaging server 14) also provides additional services, such as calendaring services, task management services, and the like.

Figure 2:
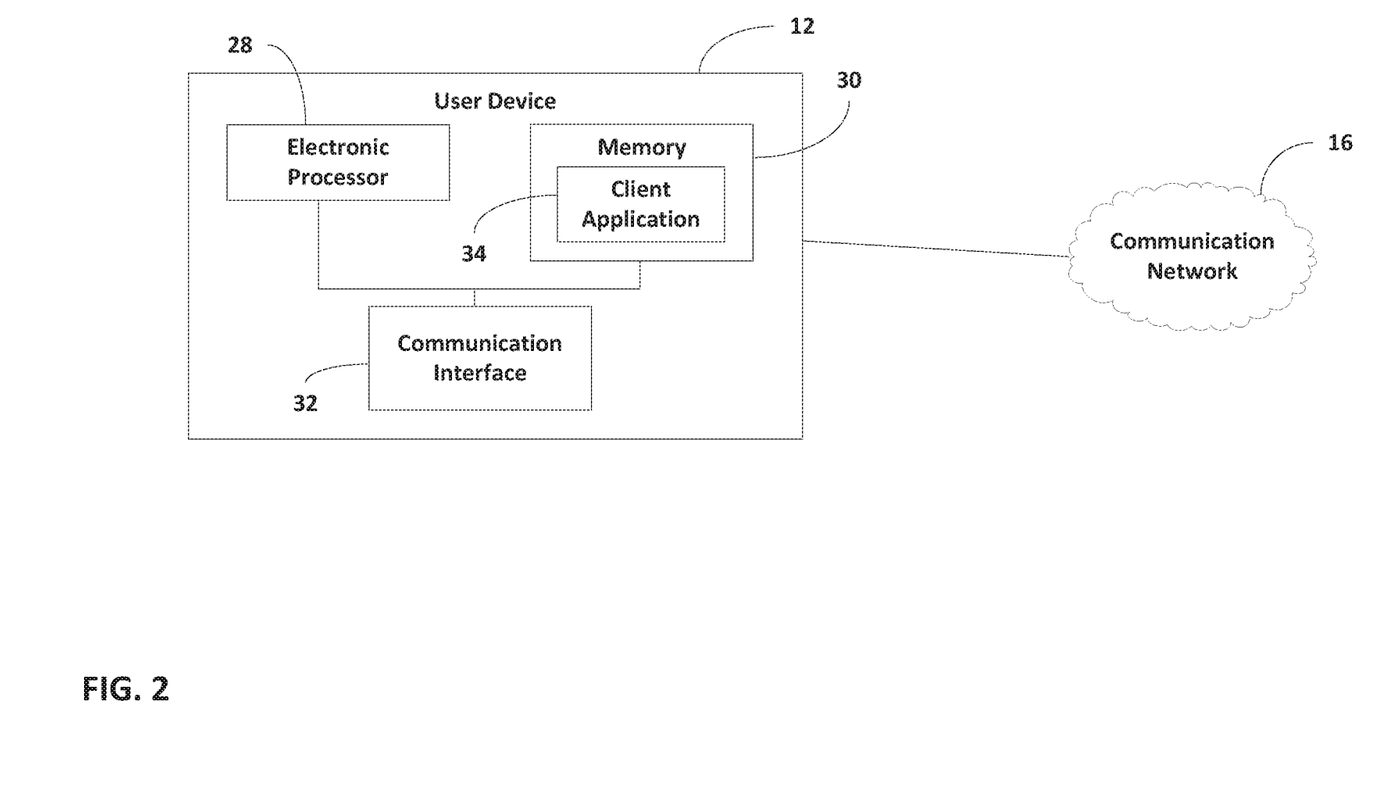
FIG. 2 schematically illustrates a user device included in the system of FIG. 1 according to one embodiment.
Figure 3:
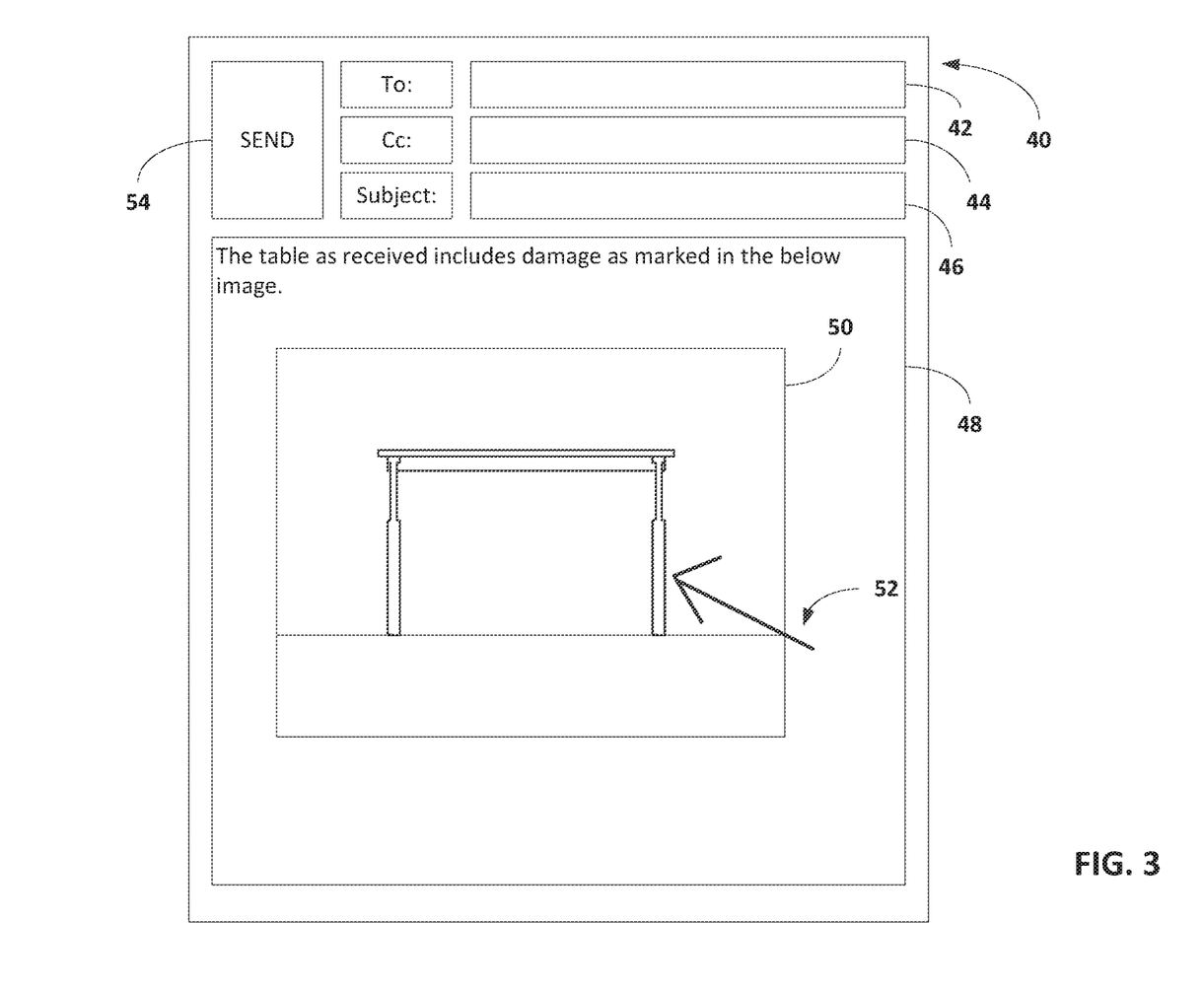
FIG. 3 is a screen shot illustrating digital ink included in the body of an electronic message.

Each user device 12 may be implemented as any number of computing devices, including, without limitation, a personal computer, a laptop computer, a desktop computer, a portable digital assistant (PDA), a mobile phone, tablet computer, an electronic book (eBook) reader device, a set-top box, a game console, a smart television, a wearable device (for example, a smart watch, electronic "smart" glasses, a fitness tracker, or the like), or any other electronic device that can transmit and receive data over one or more networks. As illustrated in FIG. 2, a user device 12 may include an electronic processor 28, a computer-readable memory 30, and a communication interface 32 similar to the electronic processor 18, the memory 20, and the communication interface 22 as described above with respect to the messaging server 14. However, as illustrated in FIG. 2, the memory 30 included in the user device 12 may store a client application 34. The client application 34, as executed by the electronic processor 28, allows a user to access the messaging services provided by the messaging server 14 (via the messaging service application 24) over the communication network 16. In some configurations, the client application 34 includes a dedicated application for communicating with the messaging server 14 and accessing the messaging services, such as, for example, Outlook® provided by Microsoft Corporation. Alternatively, the client application 34 may include a web browser (for example, Internet Explorer® provided by Microsoft Corporation) that allows the user device 12 to access the messaging service provided by the messaging server 14. It should be understood that the user device 12 may include additional components in various configurations than as illustrated in FIG. 3. For example, the user device 12 may include one or more human machine interfaces, such as a display device (a touchscreen), a cursor-controlled device, a keyboard, a speaker, a microphone, or the like.

The user device 12 (the electronic processor 28) executes the client application 34 to compose and send and receive and display electronic messages. For example, FIG. 3 illustrates an example user interface 40 (generated via the client application 34) displayed by the user device 12 (on a display device) that allows a user to compose and send an electronic message. As illustrated in FIG. 3, the user interface 40 includes "To:" input mechanism 42 and an optional "Cc:" input mechanism 44 that allows a user to enter (or select) an identifier of a recipient of the electronic message, such as an e-mail address. The user interface 40 also includes a "Subject" input mechanism 46 that allows a user to enter a subject line (description) for the electronic message and a body input mechanism 48 that allows a user to enter content for the electronic message (the body of the electronic message).

The body input mechanism 48 may include a drawing canvas that allows a user to add digital ink to the electronic message. Alternatively or in addition, the body input mechanism 48 may allow a user to add digital ink on top of an object included in the electronic message, such as an image or another drawing object. For example, as illustrated in FIG. 3, the body input mechanism 48 includes an image 50 and digital ink 52 that is positioned at least partially on top of the image 50. A user may input the digital ink 52 into the body input mechanism 48 by selecting a tool or mode within the user interface and may use a cursor-controlled device (a mouse), a stylus, or the like to input the digital ink 52. Alternatively or in addition, when the user interface 40 is displayed on a touchscreen, a user may use his or her finger as a stylus to input the digital ink 52.

When a user inputs the digital ink 52 (and selects a "Send" selection mechanism 54 as illustrated in FIG. 3), the system 10 transmits metadata associated with the digital ink 52 representing the position of the digital ink 52 with respect to other content included in the electronic message, such as text, images, and the like to the messaging server 14 as part of the electronic message. For example, Ink Markup Language (InkML) is a World Wide Web Consortium (W3C) standard for exchanging digital ink between software applications. The InkML defines trace elements, which represent a sequence of contiguous ink points, wherein each point captures values (such as the X and Y coordinates) of input provided via an input device (a stylus, a finger, or the like). Thus, a sequence of trace elements (traces) can accumulate to meaningful units, such as characters, words, or diagrams.

InkML can also be used to store additional details regarding digital ink, such as timing information, creator information, or the like. It should be understood that other types of markup languages, including proprietary languages, may be used to represent digital ink.

Accordingly, when the user adds digital ink 52 to the body of an electronic message, the digital ink 52 may be represented and stored (encoded) using InkML. Positional information is also generated for the digital ink 52 that defines the relative position of the digital ink 52 with respect to other content included in the body of the electronic message. The positional information may be stored within the InkML for the digital ink or as part of separate metadata, such as separate mark-up language data (for example, extensible markup language (XML) data). Thus, when the electronic message is sent to the messaging server 14, the message includes the InkML data and the associated positional information, which the messaging server 14 can forward to the recipient. The device used by the recipient can use the InkML data and the associated positional information to draw the digital ink 52 within the body of the electronic message at the position intended by the sender.

Figure 4:
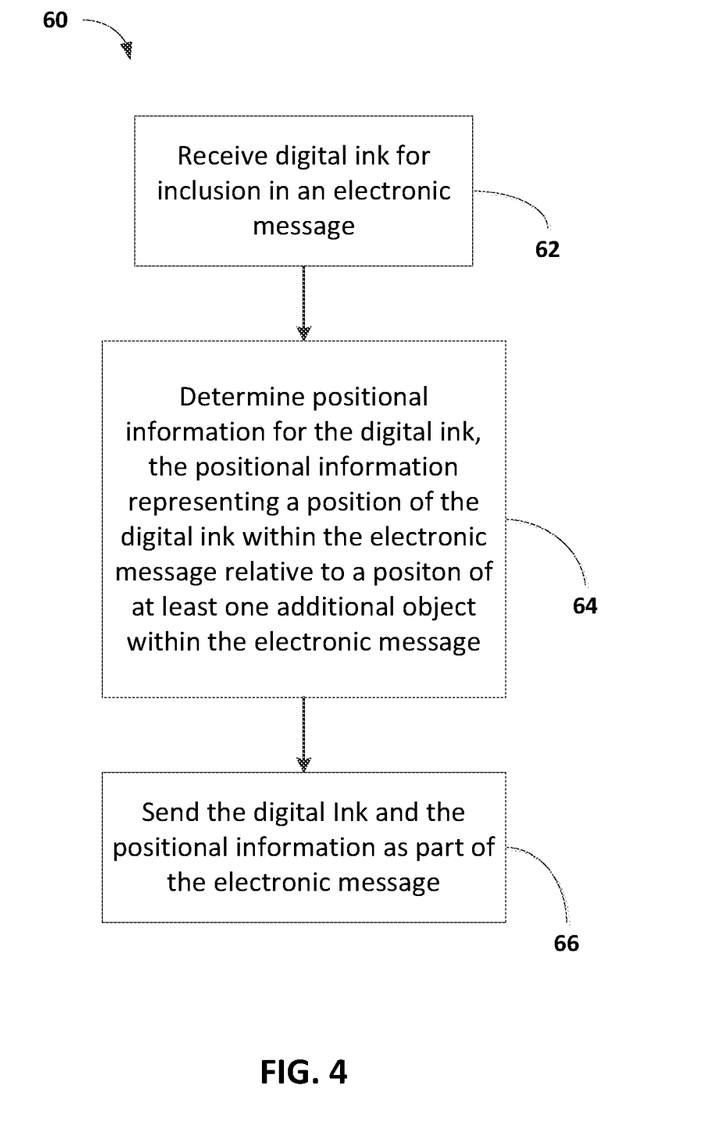
FIG. 4 is a flow chart illustrating a method for sending an electronic message while preserving a spatial relationship between digital ink and other content included in the electronic message performed by the system of FIG. 1 according to one embodiment.

For example, FIG. 4 illustrates a method 60 for sending an electronic message including digital ink using the system 10. The method 60 is described herein as being performed by the client application 34 (as executed by an electronic processor 28 included in a user device 12). However, it should be understood that the functionality described herein with respect to the method 60 may be combined and distributed in various configurations. For example, in some embodiments, the messaging service application 24 executed by the messaging server 14 performs one or more portions of the method 60. In particular, in situations where the client application 34 is a browser application, the method 60 may be performed by the messaging service application 24 based on data transmitted by the browser application to the messaging server 14.

As illustrated in FIG. 4, the method 60 includes receiving digital ink for inclusion in an electronic message (at block 62). As described above, the user device 12 may be configured to generate markup language data for the digital ink, such as InkML data, which can include coordinates of the digital ink. The markup language data may also include timing for the digital ink (defining a sequence and timing of how the digital ink was created or drawn by a user), creator information, or a combination thereof.

The method 60 also includes determining determine positional information for the digital ink, wherein the positional information represents a position of the digital ink within the electronic message relative to a position of at least one additional object within the electronic message (at block 64). As described above, the at least one additional object includes other content included in the body of the electronic message, such as, for example, text, images, icons, other digital ink, or the like. As described in more detail below, the positional information is used by a recipient to display the digital ink within the body of the electronic message at the sender's intended position to retain semantic relationships between the digital ink and other content.

The positional information identifies the shape, look, and relationship between one or more objects included in the message and the digital ink so that this shape, look, and relationship can be maintained at the receiving end regardless of what type of device or software is used at the receiving end. In some embodiments, the positional information includes a location of the digital ink within the message, such as the position of the digital ink between (before, after, or both) other content, such as other text, included in the message. In some embodiments, when digital ink is added to the body of an electronic message, a drawing canvas is added to the message (beneath any images or text included in the body) spanning (width-wise) an entire message canvas (area for adding content to the body of the message). Accordingly, the positional information may include the location of the digital ink within the message, the location of the drawing canvas within the body, or a combination thereof. Also, when the message also includes an image, a location of the image may be included in the positional information before the drawing canvas is added to preserve the original position of the image within the message. For example, in some embodiments, the addition of a drawing canvas may cause an image within the message to shift. Alternatively or in addition, the positional information may include coordinates of the digital ink with respect to the drawing canvas and any other objects overlapping with the drawing canvas, such as other images and other digital ink. Also, in some embodiments, the positional information may include a total area of the drawing canvas created for the digital ink. As described in more detail below, including this information in the positional information allow whitespaces of the drawing canvas to be removed when the message is sent so that resolution of objects included in the drawing canvas is maintained and so that such objects can be displayed on devices with varying display sizes.

In some embodiments, the user device 12 is configured to determine the positional information by determining a first position of the at least one additional object within the electronic message and determining a second position of the digital ink, and (optionally) comparing the first position to the second position. For example, the positional information may include a difference between the first position and the second position representing a distance between the object and the digital ink. The difference may also be associated with an identifier of the at least one additional object. In other embodiments, the positional information may include the first position and the second position to similarly represent a distance between the object and the digital ink. The position may be a center point, a corner, a perimeter, a bounding box, or the like of the object. In addition to the position, the positional information may also include an identifier of the object associated with a particular position. For example, the positional information may include an identifier for one or more objects and a distance between each object and the digital ink.

In some embodiments, the positional information includes information for all objects (all content) included in the body of the electronic message. For example, the positional information may include information that represents a position of the digital ink within the electronic message relative to a position of each other object included in the electronic message. However, in other embodiments, the user device 12 is configured to select a subset of the objects included in the body of the message when determining the positional information. For example, there may be some objects included in the body of the message that are unrelated to the digital ink. Accordingly, no positional information may be needed for these objects. Accordingly, the user device 12 may be configured to determine what objects are semantically related to the digital ink by applying one or more rules or logic and select these objects for use in determining the positional information as described above. The rules or logic may consider the position of objects relative to the digital ink, a type of objects included in the message, any text included in objects, or a combination thereof. For example, in some embodiments, the user device 12 is configured to compare a position of each of a plurality of objects included in the electronic message to a position of the digital ink and select objects from the plurality of objects that are within a predetermined distance from the position of the digital ink. Similarly, the user device 12 may be configured to select image objects included in the message or text that refers to the digital ink. For example, if a user typed the sentence "Connect this sentence with the paragraph below marked with the arrow," the user device 12 may be configured to select this text as being semantically related to digital ink including an arrow. In some embodiments, the user device 12 is configured to mark the objects selected for use in determining the positional information such that a user can accept or reject the selected objects. This feedback from the user may also be used to automatically set or configure the rules or logic used to select objects.

In some embodiments, the user device 12 is configured to determine and store the positional information when a user adds digital ink to an electronic message. Alternatively or in addition, the user device 12 may be configured to determine the positional information when the user selects the "Send" selection mechanism 54 to complete and send the message. For example, to efficiently use computer resources, positional information may not be generated until the electronic message is in a final state before being sent.

As illustrated in FIG. 4, the method 60 also includes sending the digital ink and the positional information as part of the electronic message (at block 66). As noted above, the positional information may be included in markup language data generated for the digital ink. Thus, in these situations, the user device 12 sends the digital ink and the positional information by sending the markup language data. As described above with respect to FIG. 1, the user device 12 sends the electronic message (including the digital ink and positional information) to the messaging server 14 via the communication network 16, and the messaging server 14 stores the electronic message for subsequent access by the one or more recipients. In response to receiving a request for the message from a user device 12, the messaging server 14 sends the requested electronic message to the user device 12, and the user device uses the positional information to display the digital ink within the body of the electronic message to maintain the sender's intended semantic meaning. For example, rather than just displaying the digital ink per the coordinates included in the InkML data, the user device 12 can use the positional information to align the digital ink with other content as that content is displayed within the body of the message. In particular, when the positional information indicates that the top-left corner of the digital ink was positioned three inches down and 2 inches to the left of an image also included in the message, the user device 12 is configured to modify the position of the digital ink as displayed within the electronic message to maintain this orientation with respect to the displayed image. In some embodiments, the user device 12 is configured to modify only the position of the digital ink based on the positional information. However, in other embodiments, the user device is configured to modify the position of the digital ink, other objects, or a combination thereof based on the positional information. Also, in some embodiments, the user device 12 may be configured modify a shape or size of the digital ink in addition to or as an alternative to modifying the position digital ink. For example, the user device 12 may be configured to increase a size of the digital ink to maintain a position of the digital ink with respect to two or more objects included in the electronic message.

In some embodiments, a user (the recipient) can select the digital ink as displayed in a received message and manipulate the digital ink like any other content included in the message. For example, a user may be able to delete the digital ink, change the position of the digital ink, or otherwise modify the digital ink. Accordingly, by sending the digital ink as part of the message, the digital ink is maintained as a separate object of the message and can be manipulated as such. Sending the digital ink as part of the message also retains the original resolution of the digital ink, which otherwise may be distorted if the digital ink were sent as an image or other type of static object.

In some embodiments, a user can select displayed digital ink to access additional information or metadata of the digital ink. For example, in some embodiments, a user (the sender) may have created the digital ink while the user added audio data to the electronic message. Accordingly, in this situation, a user may be able to select displayed digital ink to play the audio data associated with the digital ink. Using the timing information associated with the digital ink, the user device 12 may also be configured to display the digital ink at a predetermined time during playing of the audio data. For example, if the sender drew an arrow as he or she said "The table appears to be broken here," the user device 12 may be configured to display the digital ink at this time during playing of the audio data. The user device 12 may compare timestamps included in the audio data and timing information included in the markup language data (or other metadata) of the digital ink.

Similarly, in some embodiments, the user device 12 is configured to replay the creation of the digital ink when the displaying the digital ink. For example, if the sender wrote the word "Hello" as digital ink over a period of three seconds starting with the "H" and ending with the "o," the user device 12 displaying the digital ink may use the timing information associated with the replay the digital ink over the same time period within the displayed message to display how the digital ink was initially created. Replaying the digital ink includes displaying segments of the digital ink in the order, sequence, and timing as when the digital ink was created rather than just initially displaying the completed digital ink. In some embodiments, a user can select displayed digital ink to replay the digital ink within the message.

In some embodiments, a recipient may also reply to a received electronic message by adding digital ink to the body of a received message or adding digital ink to the body of a new reply message. In either situation, it may be difficult for users to track which user provided which digital ink. Accordingly, the user device 12 may be configured to use creator information included in the markup language data for the digital ink to mark digital ink as originating from a particular user or group of users. The creator information may include an identifier of a user or group of users, and the user device 12 may be configured to display an indicator that represents the identity with the digital ink. The indicator may be part of the digital ink or a separate icon or symbol displayed with the digital ink. For example, in some embodiments, digital ink can be displayed in different colors to distinguish digital ink created by different users. Alternatively or in addition, an icon represented with a user (such as a profile picture or the like) may be displayed adjacent digital ink created by the user.

In some embodiments, a user device 12 used by the recipient of an electronic message may not be configured to display digital ink using positional information as described above. Accordingly, to prevent such recipients from missing content included in the message, an image can be generated of the digital ink and one or more surrounding objects, which can be used as a fallback when the electronic message is accessed by a user device that is not configured to receive digital ink or positional information associated with digital ink as described above. In some embodiments, the user device 12 used by the sender of the electronic message is configured to generate and send the back-up image. Alternatively or in addition, the messaging server 14 may be configured to generate and store the single image based on the digital ink and the positional information transmitted by a user device.

Regardless of how the image is created, the messaging server 14 may be configured to determine, in response to receiving a request for the electronic message from a user device 12, whether the user device 12 (including, for example, the client application 34 executed by the user device 12) is configured to process digital ink and associated positional information and automatically send the appropriate data in response to the request. Alternatively or in addition, the messaging server 14 may be configured to transmit both the single image and the digital ink and associated positional information to the user device 12, and the user device 12 may be configured to determine which version of the digital ink to display to a recipient. Also, in some embodiments, a recipient can configure the client application 34 to display a particular version of the digital ink as a default or apply one or more rules to determine whether to display the actula digital ink or the generated image. Similar configuration settings can be set for a particular recipient (or client application 34) at the messaging server 14 to control how digital ink is transmitted to user device 12 for display. For example, a recipient may configure the messaging server 14 to only send the actual digital ink or only send the image of the digital ink depending on available bandwidth or other service parameters.

When an image is generated for digital ink, the user device 12 (or the messaging server 14) may also be configured to trim unused space (white space) around objects captured in the image so that the dimensions of the resulting image are as small as possible without modifying the size of objects captured within the image. For example, the user device 12 may be configured to automatically identify blocks (for example, rows, columns, or the like) of pixels in the generated image having a particular color, such as white, on a border of the image and remove these blocks of pixels from the image. Accordingly, if the electronic message is composed on a large screen but displayed on a small screen, the image is not too wide to be rendered on the small screen without shrinking the image or forcing the user to scroll to view the entire image.

Also, in some embodiments, the user device 12 (or the messaging server 14) may be configured to analyze digital ink and objects included in an electronic message to automatically determine semantic relationships between the digital ink and one or more objects included in the message when creating an image. For example, to keep the generated image as small as possible (to preventing shrinking or scrolling as described above), the user device 12 may be configured to only include objects in the image with the digital ink that are (potentially) semantically-related to the digital ink. For example, a user may add an arrow to an image to mark a particular portion of the image. In this situation, the user device 12 may be configured to identify that the digital ink is semantically-related to the image that overlaps with the digital ink but not with other objects included in the electronic message, such as other images, text, or the like. Similarly, the user device 12 may be configured to analyze text included in the body of the message to determine whether the text is semantically-related to the digital ink. Accordingly, as described above with respect to determining the positional information, the user device 12 may use the position of the objects, phrases or words included in objects, or the like to automatically determine semantic relationships with the digital ink. In some embodiments, the user device 12 is also configured to automatically segment digital ink to create a plurality of smaller images, wherein each image includes a portion of the digital ink and objects semantically-related to the portion of the digital ink. Furthermore, in some embodiments, as described above, the user device 12 is configured to automatically identify semantically-related objects for digital ink and display the identified objects to the user for approval or rejection.

Various features and advantages of some embodiments are set forth in the following claims.

What is claimed is:

1. A system for sending an electronic message including digital ink, the system comprising:
   at least one electronic processor configured to:
      receive the digital ink for inclusion in the electronic message;
      determine positional information for the digital ink, the positional information representing a position of the digital ink within the electronic message relative to a position of at least one additional object within the electronic message, wherein the at least one additional object is text, an image, or an icon;
      send the digital ink and the positional information as part of the electronic message, wherein the positional information is usable by electronic message application receiving the electronic message to maintain the relative position of the digital ink and the at least one additional object when displaying the electronic message; and
   wherein the at least one electronic processor is further configured to send the digital ink and the positional information by generating markup language data for the digital ink, the markup language data including coordinates of the digital ink and the positional information.

2. The system of claim 1, wherein the positional information includes a location of a drawing canvas including the digital ink within the electronic message and coordinates of the digital ink with respect to the drawing canvas and the at least one additional object.

3. The system of claim 1, wherein the at least one electronic processor is configured to determine the positional information for the digital ink by determining a first position of the at least one additional object within the electronic message and determining a second position of the digital ink, and wherein the positional information includes the first position and the second position.

4. The system of claim 1, wherein the at least one electronic processor is configured to determine the positional information for the digital ink by determining a first position of the at least one additional object within the electronic message and determining a second position of the digital ink, wherein the positional information includes a difference between the first position and the second position.

5. The system of claim 1, wherein the at least one electronic processor is further configured to select the at least one additional object by comparing a position of each of a plurality of objects included in the electronic message to a position of the digital ink and selecting the at least one additional object from the plurality of objects in response to the position of the at least one additional object being within a predetermined distance from the position of the digital ink.

6. The system of claim 1, wherein the at least one electronic processor is further configured to generate an image including the digital ink and the at least one additional object and send the image as part of the electronic message.

7. The system of claim 6, wherein the at least one electronic processor is further configured to identify white space in the image and remove the white space from the image before sending the image as part of the electronic message.

8. A system for sending an electronic message including digital ink, the system comprising:
   at least one electronic processor configured to
      receive the digital ink for inclusion in the electronic message;
      determine positional information for the digital ink, the positional information representing a position of the digital ink within the electronic message relative to a position of at least one additional object within the electronic message, wherein the at least one additional object is text, an image, or an icon; and
      send the digital ink and the positional information as part of the electronic message,
         wherein the positional information is usable by electronic message application receiving the electronic message to maintain the relative position of the digital ink and the at least one additional object when displaying the electronic message; and
         wherein the positional information includes a location of a drawing canvas including the digital ink within the electronic message and coordinates of the digital ink with respect to the drawing canvas and the at least one additional object.

9. The system of claim 8, wherein the at least one electronic processor is configured to determine the positional information for the digital ink by determining a first position of the at least one additional object within the electronic message and determining a second position of the digital ink, and wherein the positional information includes the first position and the second position.

10. The system of claim 8, wherein the at least one electronic processor is configured to determine the positional information for the digital ink by determining a first position of the at least one additional object within the electronic message and determining a second position of the digital ink, wherein the positional information includes a difference between the first position and the second position.

11. The system of claim 8, wherein the at least one electronic processor is further configured to select the at least one additional object by comparing a position of each of a plurality of objects included in the electronic message to a position of the digital ink and selecting the at least one additional object from the plurality of objects in response to the position of the at least one additional object being within a predetermined distance from the position of the digital ink.

12. The system of claim 8, wherein the at least one electronic processor is further configured to generate an image including the digital ink and the at least one additional object and send the image as part of the electronic message.

13. The system of claim 12, wherein the at least one electronic processor is further configured to identify white space in the image and remove the white space from the image before sending the image as part of the electronic message.

14. A system for sending an electronic message including digital ink, the system comprising:
   at least one electronic processor configured to
      receive the digital ink for inclusion in the electronic message;
      determine positional information for the digital ink, the positional information representing a position of the digital ink within the electronic message relative to a position of at least one additional object within the electronic message, wherein the at least one additional object is text, an image, or an icon; and
      send the digital ink and the positional information as part of the electronic message,
         wherein the positional information is usable by electronic message application receiving the electronic message to maintain the relative position of the digital ink and the at least one additional object when displaying the electronic message; and
         wherein the at least one electronic processor is configured to determine the positional information for the digital ink by determining a first position of the at least one additional object within the electronic message and determining a second position of the digital ink, and wherein the positional information includes the first position and the second position.

15. The system of claim 14, wherein the at least one electronic processor is configured to determine the positional information for the digital ink by determining a first position of the at least one additional object within the electronic message and determining a second position of the digital ink, wherein the positional information includes a difference between the first position and the second position.

16. The system of claim 14, wherein the at least one electronic processor is further configured to select the at least one additional object by comparing a position of each of a plurality of objects included in the electronic message to a position of the digital ink and selecting the at least one additional object from the plurality of objects in response to the position of the at least one additional object being within a predetermined distance from the position of the digital ink.

17. The system of claim 14, wherein the at least one electronic processor is further configured to generate an image including the digital ink and the at least one additional object and send the image as part of the electronic message.

18. The system of claim 17, wherein the at least one electronic processor is further configured to identify white space in the image and remove the white space from the image before sending the image as part of the electronic message.

\* \* \* \* \*